UNITED STATES PATENT OFFICE.

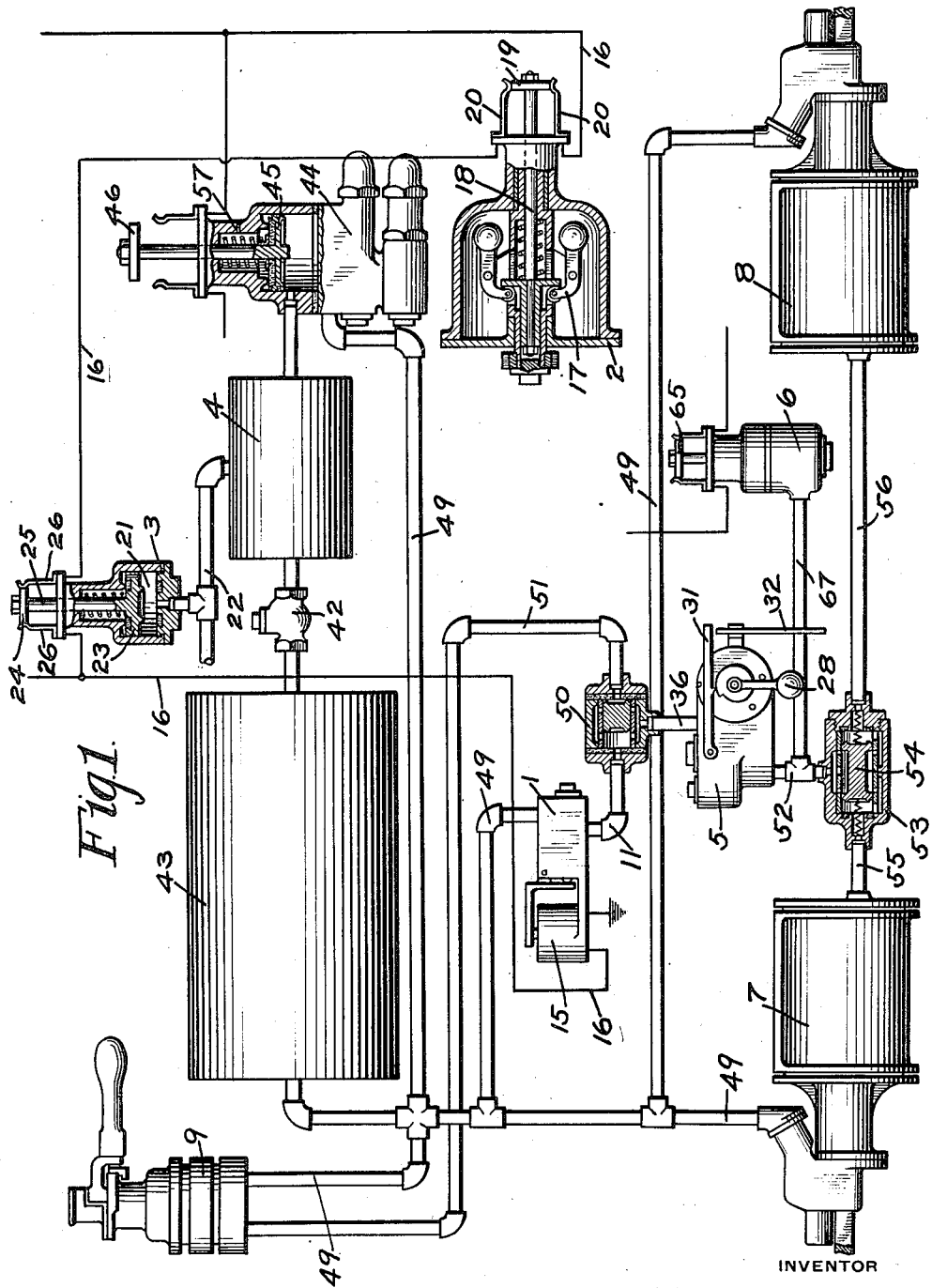

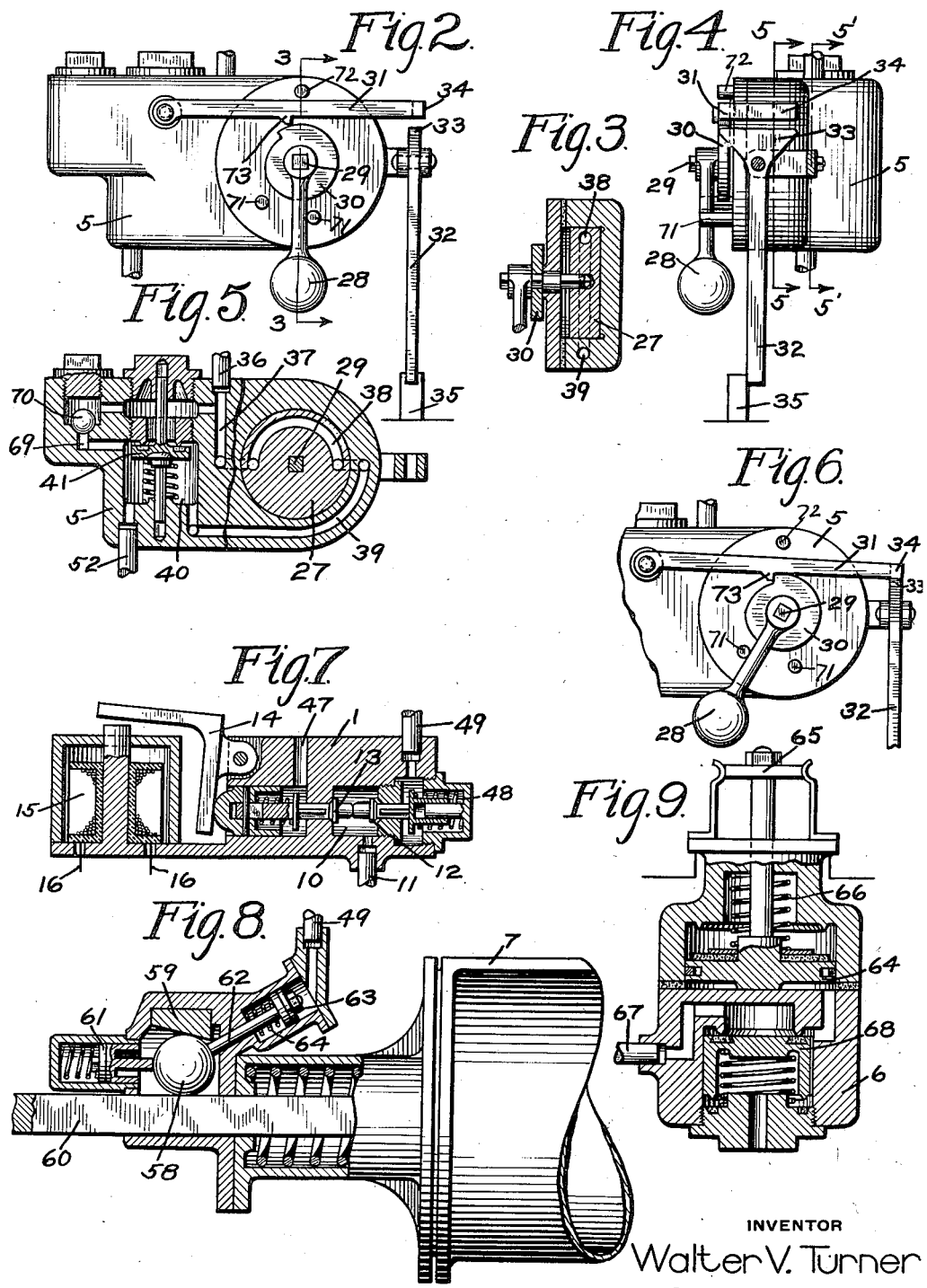

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE EQUIPMENT.

1,297,517.  Specification of Letters Patent.  Patented Mar. 18, 1919.

Application filed January 15, 1918. Serial No. 211,988.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brake Equipments, of which the following is a specification.

This invention relates to an equipment for controlling a railway car or train from a distant point.

One object of my invention is to provide means for controlling the brakes through the energization and deënergization of the line power circuit.

Another object of the invention is to provide means for applying the brakes either upon failure of the compressor which supplies compressed fluid to the train, or upon a predetermined reduction in main reservoir pressure, such as would be occasioned by excessive leakage and consequent inability of the compressor to maintain an adequate supply of compressed fluid.

Another object of the invention, is to provide means for mechanically locking the brakes applied in case the main reservoir pressure falls to a predetermined degree.

Another object of the invention is to provide means for applying the brakes when the speed of the train exceeds a predetermined limit.

Another object of the invention is to provide means for cutting off power to the car motors, when the brakes are applied and to reëstablish the power circuit upon releasing the brakes.

Another object of the invention is to provide means controlled by a trip device for automatically regulating the braking power according to whether the car is loaded or empty.

Another object of the invention is to provide means controlled by the unloading of the car for adjusting the apparatus to provide braking power corresponding with an empty car.

Other objects and advantages will appear in the following more detailed description of the invention.

In the accompanying drawings; Figure 1 is a diagrammatic view, partly in section, of an equipment embodying the features of my invention; Fig. 2 an end elevation of the device for regulating the braking power according to whether the car is loaded or empty; Fig. 3 a section on the line 3—3 of Fig. 2; Fig. 4 a side elevation of the device shown in Fig. 2; Fig. 5 a section on the lines 5—5 and 5'—5' of Fig. 4; Fig. 6 a fragmentary view of the device shown in Fig. 2, with the parts in the positions assumed after the car has been unloaded; Fig. 7 a sectional view of the device for controlling the automatic application and release of the brakes; Fig. 8 a view of a portion of one of the brake cylinders, showing in section, the means for mechanically locking the brakes applied; and Fig. 9 a sectional view of the device for controlling the car motor circuit according to whether the brakes are applied or released.

According to my invention, the equipment may comprise an electrically operated brake application and release device 1, a train speed controlled device 2 for controlling the electric circuit of the brake device 1, an electric switch device 3 operated according to the pressure in a safety reservoir 4 for also controlling the brake control device 1, a valve mechanism 5 for regulating the braking power according to the load, a switch device 6 for controlling the motor power circuit when the brakes are applied, brake cylinders 7 and 8, and a straight air brake valve 9 for manually controlling the brakes.

The brake control device 1, as shown in Fig. 7 of the drawings, may comprise a casing having a valve chamber 10 connected to pipe 11 through which fluid under pressure is supplied and released for controlling the brakes and containing an application valve 12 and a release valve 13 having engaging stems and adapted to be operated through a bell crank 14, one arm of which operates the valves and the other arm of which acts as an armature to an electromagnet 15 having its coil in a circuit 16 connected to the trolley or power circuit.

The speed controlled device 2 may comprise a casing containing a centrifugal governor 17, adapted to be operatively connected to a car axle or other revolving part of the car and arranged to operate a stem 18 carrying a movable contact 19 for engaging fixed contact fingers 20 connected into the brake circuit 16.

The electric switch device 3 may comprise a casing having a piston chamber 21 connected by pipe 22 to a safety reservoir 4 and containing a piston 23. A movable contact 24 is connected by a stem 25 to piston 23, and is adapted to engage fixed contact fingers 26 in the circuit 16.

The valve mechanism 5 may comprise, as shown in Figs. 2, 4 and 5, a casing containing a rotary valve 27, the position of which is determined by the position of a gravity actuated arm 28. On the valve shaft 29 which carries the arm 28 is a notched disk 30 and adjacent to the disk is a pivoted lever 31 having a pawl 73 adapted to engage the notch of the disk 30 when the arm 28 is swung in one direction for locking the rotary valve 27 in its adjusted position.

For the purpose of tripping the lever 31 out of engagement with the disk 30, a depending trip lever 32 is provided having a horizontally extended portion 33 at one end adapted to engage and lift a coöperating portion 34 of the lever 31 when the depending trip lever is moved in either direction by engagement with a stationary trip 35 located at desired points along the track.

When the empty and load device 5 is adjusted for load braking, in applying the brakes, fluid flows from pipe 36 to passage 37 and then through a port 38 in rotary valve 29 to passage 39 leading to valve chamber 40. When the device 5 is adjusted for empty car braking, the flow of fluid is limited by having to pass a weighted valve 41 contained in valve chamber 40.

In operation, the power circuit being energized, the usual fluid compressor (not shown) is electrically operated to compress fluid, which flows through pipe 22 to safety reservoir 4 and thence past check valve 42 to main reservoir 43.

When the pressure in safety reservoir 4 and the main reservoir 43 has been raised to the predetermined cutting out pressure of the electric pump governor 44, the governor piston 45 is operated to move the the switch contact 46 and thereby open the compressor motor circuit in the usual manner.

When the pressure in the safety reservoirs 4 has been increased to a predetermined degree, the piston 23 will be operated thereby, to cause the contact 24 to close the circuit through wire 16 and thus energize the magnet 15 of the brake control device 1.

The armature arm of the bell crank 14 is then operated, so that the other arm actuates the valves 12 and 13, the valve 12 being moved to its seat and the release valve 13 being opened, so that communication is opened from the brake cylinders 7 and 8 to exhaust port 47.

Normally, the gravity lever 28 is in the position shown in Fig. 2 of the drawings, which is the position for loaded car braking and is in this position when the car is loaded at some point on the line.

If the speed of the car exceeds a predetermined limit, the governor 17 will operate to throw out the stem 18 and the contact 19 so as to open the circuit through wire 16, thus deënergizing the magnet 15. The spring 48 will then open the valve 12 and close the valve 13, so that fluid is supplied from main reservoir pipe 49 to pipe 11, and this pressure operates a double check valve 50 to cut off the straight air pipe 51 leading to brake valve 9 and open communication from pipe 11 to pipe 36. Fluid can then flow from the main reservoir to the empty and load device 5, and if the device is adjusted for load braking, fluid will flow from pipe 36 to passage 37 and thence through port 38 in rotary valve 27 to passage 39. From passage 39 fluid flows through pipe 52 to a double check valve device 53 having a double check valve 54 normally adapted to permit flow to opposite sides thereof, so that fluid is supplied through pipes 55 and 56 to the respective brake cylinders 7 and 8 to effect an application of the brakes.

If one of the pipes 55 or 56 should break, then the pressure on the double check valve at the opposite side will force the check valve over so as to cut off communication to the brake cylinder having the broken pipe. Thus a brake application will still be obtained, even if one of the brake cylinder supply pipes should be broken.

When the speed has been reduced by applying the brakes through the operation of the speed control device, the governor 17 will operate to permit the contact 19 to again close the circuit 16 and the magnet 15 being again energized, the valve 12 is closed and the release valve 13 is opened to effect the release of the brakes.

If it is desired to stop the train at a remote point of contról, the power circuit is deënergized and since the magnet 15 is thereby deënergized, a brake application will be effected in the same manner as heretofore described when the circuit 16 is opened.

It will also be evident that if the power circuit should fail by accident, the magnet 15 will be deënergized to effect an application of the brakes.

When the governor 44 is cut in, communication is opened from the safety reservoir 4 to a restricted exhaust port 57 above the piston 45 of the governor, but so long as the compressor is working normally, the escape of fluid from the safety reservoir through the exhaust port 57 will not be sufficient to influence the pressure in said reservoir. If, however, the compressor fails to operate properly, due to a burn out or other cause, the venting of fluid from the safety reservoir 4 will finally reduce the pressure therein, so as to permit the piston 23 to move the contact 24 and open the circuit 16, thereby causing the deënergization of magnet 15 and the application of the brakes.

In a similar manner, if the pressure in the main reservoir 43 and the safety reservoir 4 should fall below a predetermined degree, the piston 23 will be operated to open the circuit 16 and effect an application of the brakes.

When the car has arrived at the point for unloading, the act of unloading, as by turning the car over, causes the swinging of gravity lever 28, by gravity, to the position shown in Fig. 6 of the drawings, the gravity lever being locked in this position by the engagement of pawl 73 of lever 31 with the notched disk 30.

This movement of the gravity lever 28 rotates the valve 27 so as to cut off communication through the valve between the passages 37 and 39 and consequently when an application of the brakes is effected, fluid can only pass to the brake cylinders by lifting the weighted valve 41 from its seat. By this means, the pressure of fluid supplied to the brake cylinders is limited to a degree desired for braking an empty car. Otherwise, the brakes are automatically applied by operation of the various instrumentalities as heretofore described.

When the car arrives at the point where the same is to be loaded, a track trip 35 is arranged to engage the trip lever 32, which is then turned so as to cause the portion 33 to engage the portion 34 of lever 31 and thus lift the lever 31, permitting the gravity lever 28 to turn the rotary valve 27 to the load position, as shown in Fig. 5 of the drawings. Upon its return trip, the car which is now loaded, will have its empty and load device 5 adjusted for load braking.

In order to insure the quick release of the brakes regardless of the position of the empty and load device 5, a by-pass 69 containing a check valve 70 may be provided between the pipes 52 and 36, so that fluid can be freely released from the brake cylinders, while the check valve 70 prevents flow to the brake cylinders.

In order to limit the swinging movement of the gravity arm 28, pins 71 may be provided, said pins being adapted to engage the arm upon movement in either direction. A similar pin 72 may be provided for limiting the movement of the pawl lever 31.

If the main reservoir pressure falls to a predetermined degree, the brakes will be automatically applied by the opening of the circuit 16 as heretofore described, but the fluid in the brake cylinders is now liable to leak away, with no means for replenishing it. Under the above conditions, it is desirable to hold the brakes applied until the main reservoir pressure has again been restored. For this purpose, a mechanical locking device is provided, such as shown in Fig. 8 of the drawings, which may comprise a ball 58 interposed between a wedge 59 and the brake cylinder push rod 60. The ball 58 is yieldingly forced into gripping relation between the wedge 59 and the push rod 60 by a spring pressed member 61, and a stem 62 carried by a piston 63 acts on the ball with a tendency to free the ball from its gripping relation.

The piston 63 is subject on one side to the pressure of a spring 64 and on the opposite side to main reservoir pressure supplied through main reservoir pipe 49.

When the main reservoir pressure exceeds a predetermined degree, the resistance of the spring 64 and the member 61 is overcome, and the ball 58 is forced out of gripping engagement with the push rod 60. If the main reservoir pressure should fall below a predetermined degree the brakes will be automatically applied, as heretofore described, and at the same time, the reduced main reservoir pressure will permit the member 61 to force the ball 58 into gripping engagement with the push rod 60, so that the brakes will now be mechanically locked applied.

The brakes may be manually controlled, if desired, by manipulation of the brake valve 9 in the usual manner. In this case, the brakes may be applied by moving the brake valve to application position, in which fluid under pressure is supplied to the straight air pipe 51 and the double check valve 50 is then shifted by fluid in the straight air pipe to open communication for supplying fluid from the straight air pipe to the brake cylinders.

In order to open the motor power circuit of the car when the brakes are applied, a switch device 6 is provided, comprising a piston 64 for operating a switch 65 in the power circuit.

The switch 65 is normally held closed by spring 66, but upon applying the brakes, fluid is supplied through pipe 67 to the exposed end of a valve piston 68 which is operated at a predetermined pressure for opening communication to one side of piston 64. The piston 64 is then actuated to open the power circuit, so that current is cut off from the car motors.

Upon releasing the brakes, fluid is also released from piston 64 and the piston 64 then operates to again close the switch 65.

Having now described my invention, what I claim as new and desire to secure by Letters Patent, is:—

1. The combination with a device for regulating the braking power according as the car is empty or loaded, of means operated upon movement of the car to dump same for adjusting said device for empty car braking.

2. The combination with a device for regulating the braking power according as the car is empty or loaded, of means operated by gravity upon movement of the car to dump the contents for adjusting said device for empty car braking.

3. The combination with a device for regulating the braking power according as the car is empty or loaded, of means located along the track for adjusting said device for loaded car braking.

4. The combination with a device for regulating the braking power according as the car is empty or loaded, of a trip located along the track for adjusting said device for loaded car braking.

5. The combination with a device for regulating the braking power according as the car is empty or loaded, of means operating upon unloading the car for adjusting said device for empty car braking and means located along the track for adjusting said device for loaded car braking.

6. The combination with a device for regulating the braking power according as the car is empty or loaded, of a gravity arm operated upon unloading the car for adjusting said device for empty car braking, a member for holding said arm in its empty position, and means located along the track for tripping said member to permit the gravity arm to move to its loaded car position.

7. The combination with a fluid pressure brake system having a reservoir into which fluid is compressed, of means operated upon failure of the compressor for effecting an application of the brakes.

8. The combination with a fluid pressure brake system having a reservoir into which fluid is compressed, and an electric compressor governor for cutting the compressor into and out of action, of a safety reservoir adapted to be connected to an exhaust port in the cut in position of the governor and means operated upon a predetermined reduction in pressure in the safety reservoir for effecting an application of the brakes.

9. The combination with an electro-fluid pressure device for controlling the brakes, and an electric compressor governor for controlling the cutting in and out of the compressor which supplied fluid under pressure to the brake system, of a safety reservoir adapted to be connected to an exhaust port in the cut-in position of the governor and an electric switch device controlling the circuit of said electro-fluid pressure device and adapted to be operated upon a predetermined reduction in pressure in said safety reservoir.

10. The combination with a fluid pressure brake system having a main reservoir, of an electric compressor governor, a safety reservoir through which fluid is supplied to the main reservoir and adapted to be connected to an exhaust port in the cut-in position of the governor, means operated upon a predetermined reduction in pressure in the safety reservoir for effecting an application of the brakes, and a check valve for preventing back flow from the main reservoir to the safety reservoir.

11. In a fluid pressure brake system, the combination with a brake cylinder and a reservoir from which fluid is supplied for controlling the brakes, of means constantly subject to fluid pressure from said reservoir and operated upon a predetermined reduction in reservoir pressure for locking the brakes applied.

12. In a fluid pressure brake system, the combination with a brake cylinder and a main reservoir from which fluid is supplied for controlling the brakes, of a locking device for holding the brake cylinder push rod in brake applied position and means operated by a predetermined pressure in the main reservoir for preventing said locking device from acting.

13. The combination with an electrically operated fluid pressure brake controlling device having its circuit controlled from a line power circuit, of a train speed controlled device and a device controlled according to the pressure of fluid compressed for the brake system for also controlling the circuit of said brake controlling device.

In testimony whereof I have hereunto set my hand.

WALTER V. TURNER.